(12) United States Patent
Johnson

(10) Patent No.: US 10,481,860 B2
(45) Date of Patent: Nov. 19, 2019

(54) SOLAR TABLET VERBAL

(71) Applicant: Gregory Walker Johnson, Dayton, OH (US)

(72) Inventor: Gregory Walker Johnson, Dayton, OH (US)

(*) Notice: Subject to any disclaimer, the term of this patent is extended or adjusted under 35 U.S.C. 154(b) by 155 days.

(21) Appl. No.: 14/545,605

(22) Filed: May 29, 2015

(65) Prior Publication Data
US 2015/0370533 A1 Dec. 24, 2015

Related U.S. Application Data

(63) Continuation-in-part of application No. 12/322,310, filed on Feb. 2, 2009, now abandoned.

(51) Int. Cl.
| | | |
|---|---|---|
| *G06F 3/16* | (2006.01) | |
| *H04M 1/725* | (2006.01) | |
| *G10L 15/22* | (2006.01) | |
| *G10L 15/26* | (2006.01) | |

(52) U.S. Cl.
CPC ............ *G06F 3/167* (2013.01); *G10L 15/22* (2013.01); *G10L 15/265* (2013.01); *H04M 1/72522* (2013.01); *H04M 1/72547* (2013.01)

(58) Field of Classification Search
CPC . G10L 15/265; G10L 15/00; G10L 2015/223; G06F 3/16; G06F 3/0227; G06F 17/28; G06F 1/1632; H04M 1/026; H04M 2250/64; H01M 10/465; H04N 5/63; H04N 21/4751

USPC ......... 704/275, 277, 2–7, 9; 455/556.1, 566; 345/168, 163; 348/730, 563
See application file for complete search history.

(56) References Cited

U.S. PATENT DOCUMENTS

| | | | | |
|---|---|---|---|---|
| 7,454,348 B1* | 11/2008 | Kapilow | ............... | G10L 13/033 704/258 |
| 7,509,270 B1* | 3/2009 | Hendricks | .............. | G06Q 30/02 705/26.9 |
| 8,058,738 B1* | 11/2011 | Bertz | ...................... | F22B 1/006 126/692 |
| 9,223,136 B1* | 12/2015 | Braun | .................. | G02B 27/017 |
| 2003/0145197 A1* | 7/2003 | Lee | .......................... | H04L 63/12 713/155 |
| 2005/0254778 A1* | 11/2005 | Pettersen | ................. | H04R 1/44 386/333 |
| 2006/0109113 A1* | 5/2006 | Reyes | ...................... | G08B 7/06 340/541 |
| 2007/0015494 A1* | 1/2007 | Sinclair | ............. | H04M 1/72572 455/414.1 |
| 2007/0132733 A1* | 6/2007 | Ram | ..................... | G06F 3/0227 345/163 |
| 2008/0094025 A1* | 4/2008 | Rosenblatt | ........... | G06F 1/1616 320/101 |
| 2009/0189566 A1* | 7/2009 | Crawford | ................. | F21L 4/02 320/116 |
| 2009/0209287 A1* | 8/2009 | Ravelo | ................. | G06F 1/1632 455/556.1 |

(Continued)

*Primary Examiner* — Paras D Shah

(57) ABSTRACT

A Solar Tablet verbal with nano scale layers, lithium battery a solar MP3 player, e-books reader, e-newspaper reader, and e-magazine reader. All units are operable by verbal command and can work manually from an ultra-high definition touch screen. The solar technology utilizes the Photo electric effect with nano scale layers to boost solar cell efficiency. The tablet has encryption software.

1 Claim, 5 Drawing Sheets

(56) References Cited

U.S. PATENT DOCUMENTS

| | | | |
|---|---|---|---|
| 2010/0279740 A1* | 11/2010 | Lee | G06F 1/3231 455/566 |
| 2011/0102676 A1* | 5/2011 | Dai | H04N 21/4751 348/563 |
| 2011/0119298 A1* | 5/2011 | Arrasvuori | G06F 17/30867 707/769 |
| 2011/0119715 A1* | 5/2011 | Chang | G08C 17/02 725/53 |
| 2011/0206353 A1* | 8/2011 | Yeo | G06F 1/3231 386/291 |
| 2011/0298594 A1* | 12/2011 | Mish | G08C 17/02 340/12.22 |
| 2012/0062465 A1* | 3/2012 | Spetalnick | G06F 3/0236 345/168 |
| 2012/0188463 A1* | 7/2012 | Deshpande | H04N 5/63 348/730 |
| 2013/0217330 A1* | 8/2013 | Gardenfors | H04M 1/7253 455/41.2 |
| 2013/0342977 A1* | 12/2013 | Chang | H05K 5/0217 361/679.01 |
| 2013/0344917 A1* | 12/2013 | Sobti | H04M 1/0254 1/254 |
| 2014/0101238 A1* | 4/2014 | Soon-Shiong | H04L 67/42 709/203 |
| 2014/0181303 A1* | 6/2014 | Meyer | H04W 8/18 709/225 |
| 2015/0017909 A1* | 1/2015 | Meunier | H04N 5/23229 455/41.1 |
| 2015/0220299 A1* | 8/2015 | Kim | G06F 3/0488 345/1.3 |
| 2015/0236743 A1* | 8/2015 | Kennedy | H04B 1/3888 455/575.8 |
| 2015/0277503 A1* | 10/2015 | Eremenko | G06F 1/1658 361/679.4 |
| 2015/0317837 A1* | 11/2015 | Sholudko | G06T 19/006 345/633 |
| 2015/0324706 A1* | 11/2015 | Warren | G06N 99/005 700/275 |

* cited by examiner

SOLAR TABLET VERBAL

CROSS-REFERENCE TO RELATED APPLICATION(S)

This application claims priority from U.S. Non-Provisional utility application Ser. No. 12/322,310 filed Feb. 2, 2009.

SUMMARY OF THE INVENTION

The Solar Tablet with nano scale layers for verbal commands (VC) works manual as well. A solar cell phone, laptop, desktop, solar television wireless standard size 19 inch, 32 inch, 42 inch, 50 inch, MP3 player with camera, the solar tablet with front and back facing camera, solar portable hand held game player, solar keyboard and mouse all units will have a built in solar battery and a solar cell built in all units. A rechargeable built in battery collects energy from the solar cell collects energy from the sun or exposure to light. All units can work by verbal command. Watch television on your tablets as well. The verbal command remote control changes television channels, selects programs by verbal command. St. G. Tech is light years ahead of the rest of the world with innovation. Read a foreign newspaper it will come out in English if you prefer or stay in the foreign language if that's your native.

Our plan would incorporate the voice recognition software and identify how to interface to it, then build a database of command sets that the computer could execute and keywords that would trigger an action based on the content of the message. For example, if the command was e-mail Jack please, then the keyword of e-mail would be used to invoke a command of sending e-mail, followed up with "Jack", which would be the target address, customized to the user to it would assume his last name. Input devices connected to the laptop would include a microphone, cellular phone, headset, keyboard. Output would be managed by the software, primarily through the form of a software service that is continuously running, interpreting input and managing output.

DETAILED DESCRIPTION OF DEVICE

Figure 1:
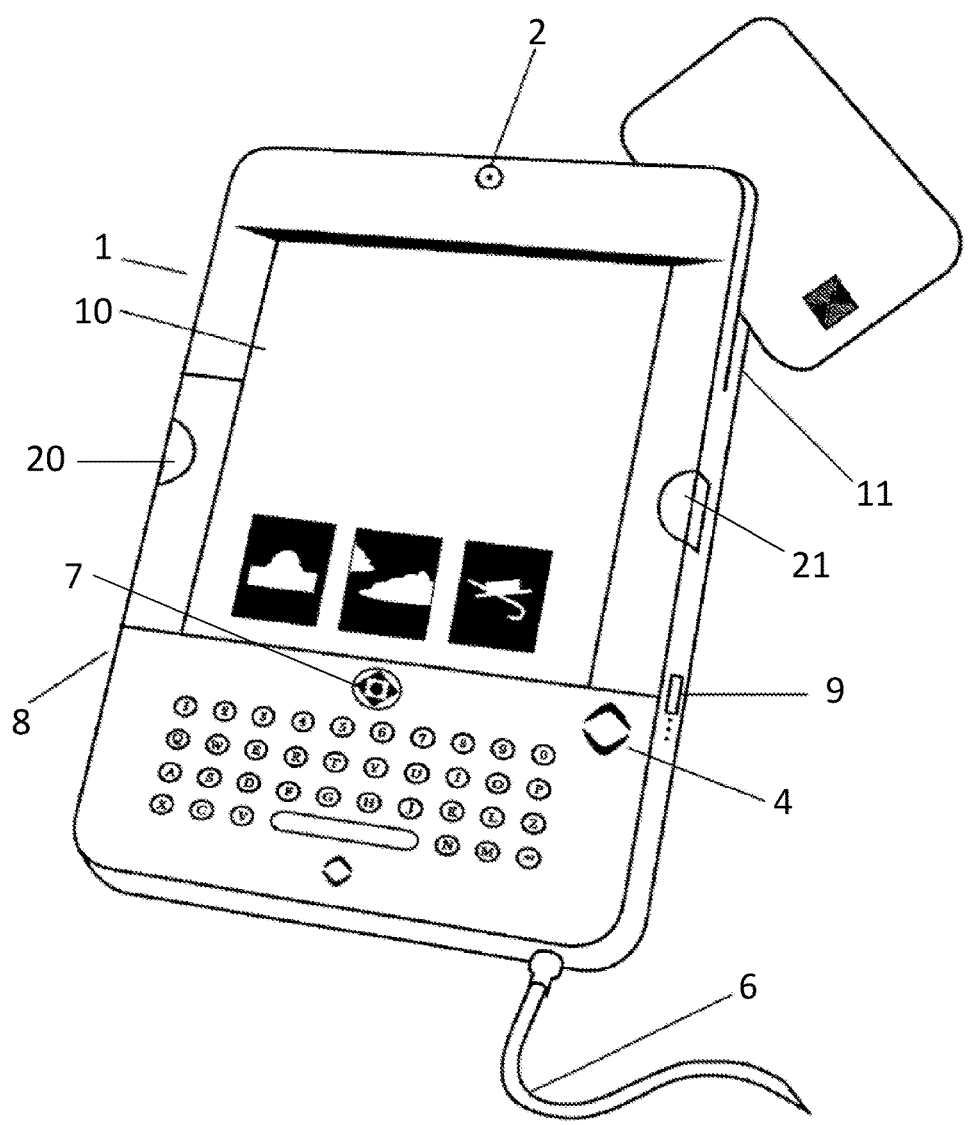
FIG. 1 Shows front view of solar verbal tablet with camera, touch screen and how to use credit card for manual use on tablet and USB port, keyboard for manual use. Capable of news, weather and entertainment with ear plugs, built in credit smart card microchip reader, and menu button, and speaker, television and phone. All hardware will have encryption software.

FIG. 1 Shows front view of Solar Tablet™ Verbal 1 with features TV, phone, news, weather, entertainment BCCR™ Built in Credit Card Reader Software™, with camera 2. speaker 4. ear plug port 6. menu button 7 attachable and detachable keyboard 8. USB port 9. Light Window Port (LWP) 10. Manual built credit smart card microchip reader II. The tablet is further provided with a "last page" button 20 and a "next page" button 21.

Figure 2:
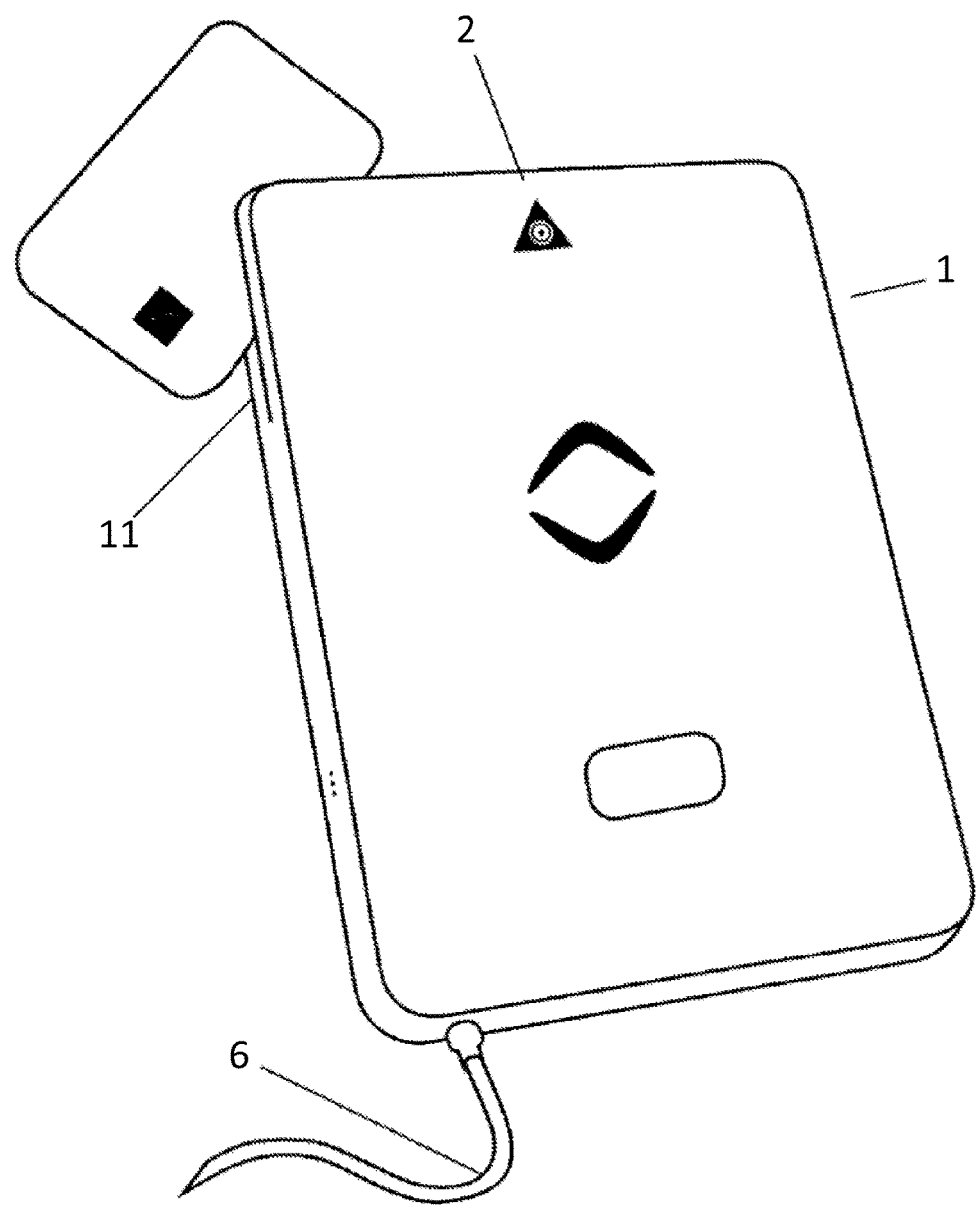
FIG. 2 Shows back view of solar verbal tablet and back facing camera and how to use credit card for manual use with ear plugs.

FIG. 2 Shows back view of solar tablet 1. with back facing camera 2. ear plug port 6. and manual built in credit card reader 11. and boomerang Swiss G logo.

Figure 3:
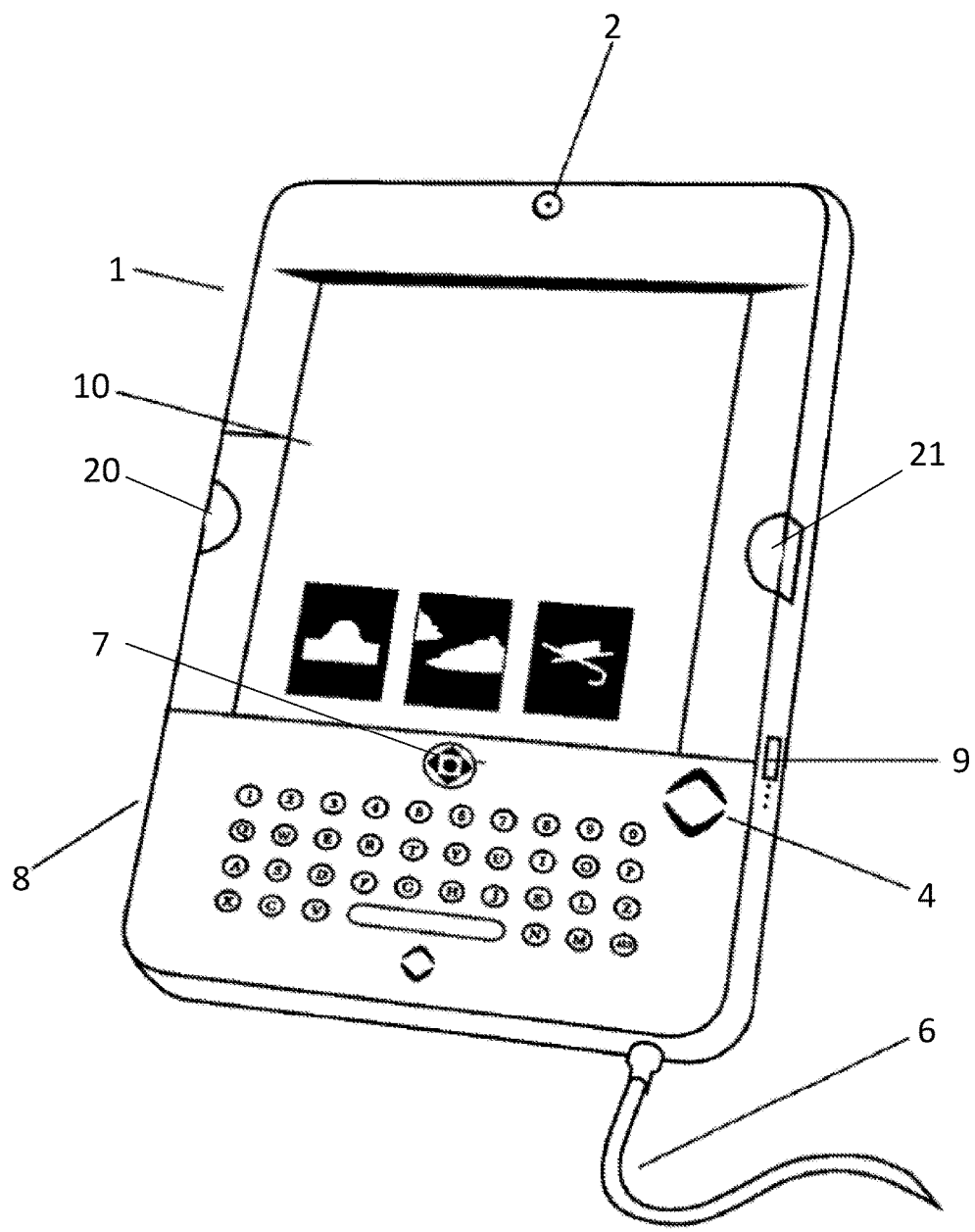
FIG. 3 Shows front view of solar verbal tablet for kids, with camera, USB port, touch screen and keyboard for manual use with ear plugs, and menu button, and speaker. Will have encryption software.

FIG. 3 Shows solar tablet for LiL kids tablet 1 with features and camera 2. speaker 4. with ear plug port 6. and menu button 7. attachable and detachable keyboard 8. USB port 9. Light Window Port (LWP) 10. The tablet is further provided with a "last page" button 20 and a "next page" button 21.

Figure 4:
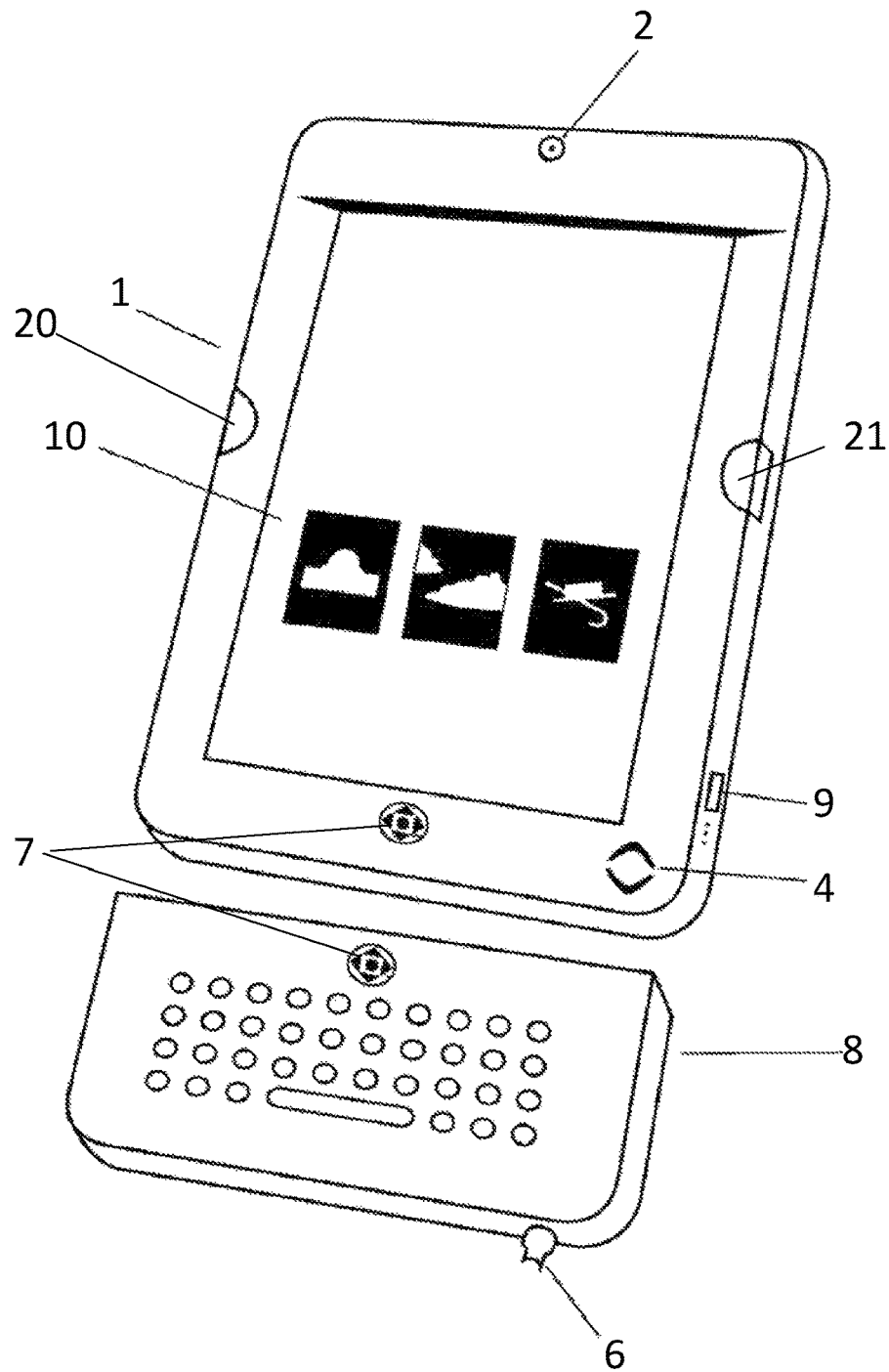
FIG. 4 Shows front view of solar verbal tablet with camera, USB Port, and attachable and detachable keyboard. Built in credit card reader, and menu button, television, phone.

FIG. 4 Shows solar Tablet™ Verbal 1. Features news, weather, entertainment, television, phone, built in credit card reader software, with camera 2. speaker 4. menu button 7. USB port 9. and Light Window Port (LWP) 10. FIG. 4 further shows actual attachable and detachable keyboard 8. ear plug port 6. menu button 7. The tablet is further provided with a "last page" button 20 and a "next page" button 21.

Figure 5:
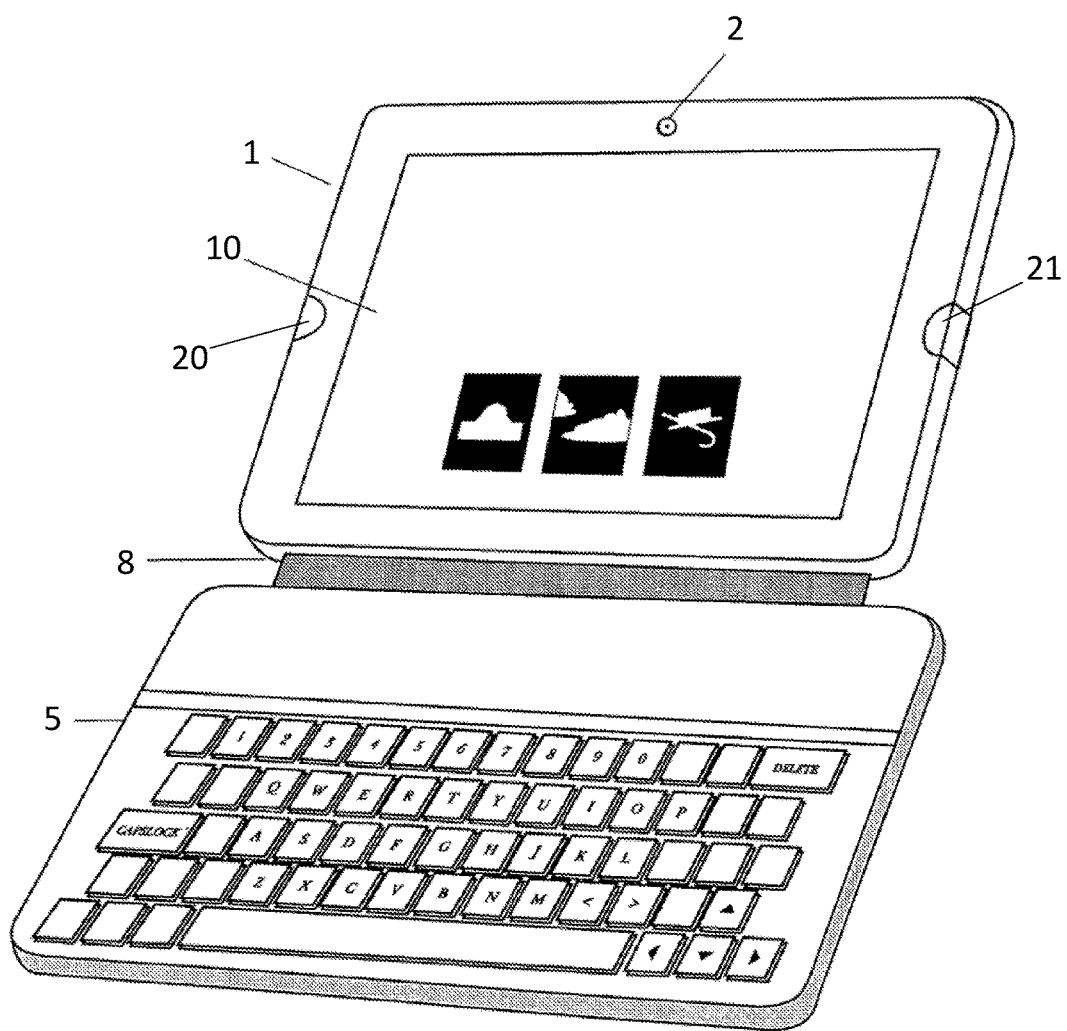
FIG. 5 Shows front view of a solar attachable and detachable tablet, called the Tablap™ 1. with phone, TV, weather, news, entertainment, with built in software credit card reader, with camera 2. keyboard 5. where it is attachable and detachable keyboard 8. Light Window Port (LWP) 10.

FIG. 5 Shows front view of a solar attachable and detachable tablet, called the Tablap™ 1 with phone, TV, weather, news, entertainment, with built in software credit card reader, with camera 2. keyboard 5. where it is attachable and detachable keyboard 8. Light Window Port (LWP) 10. The tablet is further provided with a "last page" button 20 and a "next page" button 21.

What is Claimed:

A Solar Device comprising: A telephone on a digital television tablet for making calls, a front and back facing camera on tablet, a television remote control comprising changing program episodes, channels and private E-mail, E-books, E-textbooks, E-news, E-newspaper and E-magazine wherein the device can also control a wireless monitor and laptop using verbal command; a lithium battery in solar hardware photovoltaic with nano scale layer to boost solar cell efficiency and wherein the device is further operable to interface with an internal and external search engine, using verbal commands, for cell phones, wherein the device is further operable to connect to external social networks, tablets, wrist watches, cell phones, tablets, portable game players, wherein all functions of the device are operable manually, digital coding with encryption software wherein all functions of the device, including taking photos, are operable by verbal command.

The device of claim 1 further comprising: wherein photos sorted by a first camera using verbal command wherein the device further comprises a second, third and fourth camera for view video around a car, jet plane, train, bus for view by cell phone or tablet, a sensor when another plane is close; verbal directions for the right runway so planes will not take the wrong runway, and airports, keeps transponder on at all times for location and altitude, weather updates with radio frequency and data streaming from satellites, encrypted from cockpit, a mini solar pyramid shaped satellite 4 inches wide and 4 inches high, encrypted flight airline schedules, energy systems, nuclear power plants, the encrypted software systems will take control of the airplane if a pilot tries to take the aircraft down intentionally and it will fly like a drone and, upon notification, the control tower can then bring the plane down safely and stop a train from going too fast around a curve, the software will tell the conductor to slow down or it will shut it down, to stop a wreck.

The device of claim 1 the device plays music files wherein the function are implemented using encrypted software that selects, stores and shares music files using verbal commands from the user and view movies and other users on dash board of automobiles, portable game player, cars, the wireless earplugs software allows users to select TV to watch on tablet artists bio information wherein all functions of device are operable by manual ultra high definition touch screen by verbal command wherein the wireless music headset is controllable by verbal command.

The device of claim 1 further comprising encrypted software for video game functions for toy horses, life size horses, toy and real helicopter with a camera inside; driving toy and real cars, toy dolls, toy guns, television games by verbal command.

The device of claim 1 wherein the verbal command functions include critique letters, for school, business plan, software that corrects spelling, e-mail, a blue lighting sign will appear in email under the word, puts commas, semicolon, capital letters; periods all in their right place, just say critique; a CRQT button corrects manually as well, a function produces foreign language; wherein a translation function produces a translation from a source language into a second foreign language; wherein the language is critiqued wherein the second language translation is output by the speaker in an audible form for E-newspapers, E-magazines, E-books and E-text books on tablet.

The device of claim 1 wherein the device is further operable to make video call connection with cellular phones using cellular phone networks and/or computers through the internet, phone use from tablet to tablet calls from cell to tablet as well, cell phone, MP3 player, laptops, tablets, all mobile devices, verbal clicking.

The device of claim 1 wherein the function of device can share photos sort pictures on built in projectors on tablets, laptops, cell phones, desktops; wherein the device is further operable to select names to share sports, movies, books, music, foods, restaurants, clothing, news clips, video sound say VR to see and hear from cell phone or tablet, MP3 player, video games, fashion shows, birthdays, Halloween, holidays, Kebra Nagast, the Bible, Kabbalah, Koran, Hadith, Passover, Yomkipor, 5 Daily Prayer's, Juma, Ramadan, Rosh Hashanah, Easter, Christmas, travel direction, anything by verbal command; just say share and it will go to that person by name on your tablet, weather on your tablet E-radio on your tablet as well, transfer and share data wireless to any tablet, cell phone, to mobile devices.

The device of claim 1 wherein the tablet is able to run multiple applications at a time; and media ports take pictures with software for any foreign language worldwide to read news papers, E-magazines, E-books, E-news for blind people worldwide, emergency lock down software for all schools on students mobile devices, cell phones: alerts when to come or stay away from school or don't leave classroom; by verbal command.

The device of claim 1 wherein the function can load all E-text books in your tablet during the term of the course, in any language worldwide with a slot on tablet screen to change pages by verbal command or manually, all your books for every class in your tablet, laptop, cell phone; publishers buy the software users pay for the term or by day.

The device of claim 1 wherein functions comprise a built in credit card reader encrypted software and tablet, and slot for microchip credit cards and magnetic strips credit cards for users to pay bills, user information is hard to steal with the microchip sensor card; also on MP3 player to buy music and cell phones; the tablet, cell phone, MP3 player, mobile device has a built in credit card reader; with encrypted coding verbal password, that translates a different code for each time it is used that works with a micro chip for users.

The device of claim 1 wherein the verbal software capable of use in a smart watch, the watch will beep alert, such as listen to verbal e-mail, verbal stock market updates, small speakers output in an audible form, wireless earplugs, listen to e-books, e-news, e-newspapers in any foreign language; it's a tablet on your wrist watch and phone as well as GPS enabled also, smart solar watch can give birthdays, weather, take pictures, social net work updates, make reservations, restaurant locations, share by verbal command video games, call a cell phone or tablet from your watch command a print out to your printer, fax, medical records access, 911 emergency calls from smart watch, verbal scrolling and zooming in and out, make airline reservations by your watch, it's a computer on your wrist, listen to the radio as well, travel directions, all by verbal command and works manually also a media port for earplugs, see other smart watch users as well on your watch, pay for items, see banking messages, advertising ads on your cell phone, tablet, MP3 player, laptop, watch TV on your smart watch, it is stand alone and it doesn't need another device to function, my Jinah search engine verbal, example: say special events to pay for a championship boxing title fight, or movie the same day it comes out at the theater, whatever is available to buy on your tablet, television, or cell phone, all mobile devices, encrypted website as well; pay from you remote control or by voice, it's much easier.

The device of claim 1 wherein that the function device includes an attachable and detachable tablet; at the top it's a tablet the bottom is a wireless keyboard that runs by software, one gets two products in one, a magnet will keep the tablet in place on the keyboard, capable of architect using rulers and reading blue prints.

The device of claim 1 wherein the function of the device is operable to start your car engine by verbal command from your cell phone, say start engine by voice recognition to stop theft start by verbal command inside your car in the dash board; also you can start by finger print scanner or manually if you prefer, pay taxi fare by cell phone paperless; biz tip software for taxi driver have a code access application for downloading it will beep and sound for accepted payment by rider, tips as well, encrypted.

The device of claim 1 wherein the function of the device is operable private e-mail that is encrypted for users only will have keys for access, (E) means encrypted mail is in your box, (G) for general e-mail, one must make a request by signing up to communicate with other users like an application, called PE software only the USA Government will be allowed to check users E-mail with a court order, encrypted cell phone, tablet, MP3 player, laptop.

The device of the claim wherein the functions are implemented using software for a standard size wireless flat screen television with a remote control that is solar like the television, A user can change TV programs by going directly to that program episode by saying "New York and Chicago Basketball Championship," by my Jinah operating system search engine, take photo from your TV as well the television will tell when a program is coming on too; like it will be aired Thursday, Apr. 18, 2014, at 1:00 pm and record a show by verbal command, or go directly to an episode scene, works manually as well.

The device of claim 1 wherein software is able to send feeds from television networks; to mobile devices such as tablet, cell phones, MP3 players, laptops for users anywhere in America, to watch programs and no limit to just home view.

The device of claim 1 wherein the device is further comprises a wireless solar cash register and scanner wherein said drawer is controllable to print receipts and give correct change by verbal command.

The device of claim 1 wherein the device is operable to receive star gazing just by saying "Galaxy" it will allow users to see the eclipse of the sun and moon, the entire galaxy from their tablet on cell phone, laptop, desktop, MP3 player that are implemented with star gazing software; the observatory that watches the galaxy with huge telescopes constantly can share data with users worldwide.

The device of claim 1 wherein the device further comprises a solar wireless desktop tablet monitor and keyboard; solar wireless mouse, wireless standard solar television with a built in receiver both with digital circuitry boards, with encrypted password and software.

The device of claim 1 wherein the device is operable to banking make payment to your bank account write a check; pay a bill withdraw an amount from mobile devices smart cell phone, laptop or tablet, MP3 player by verbal command, capable to function with automated teller machines say I am next and your money request will be at teller machine with amount you ask for; verbal kill switch to stop all transactions when needed; in any foreign languages; verbal command banking, the check will be on your cell phone and you can make a payment or send money to your account by verbal command, a picture of your check will stay on your cell phone, laptop, desktop, or tablet, the voice recognition will be trained to know the users voice and you can transfer money to an account to pay someone, an ID number will be on your account for security; verbal command banking will have a photo of your check at all times on your cell phone, tablet, desktop and laptop, example you want to write a check for $500 just say deposit five hundred dollars and it will put the amount in your bank account, if it is a payment it will send it to the party that you want it to go; verbal banking can also withdraw money from your account by selecting a specific amount example the user will just say I need thirteen hundred dollars withdrawn then it will tell the user where the closest ATM machine is located and the user can make a transaction before he or she gets to the ATM machine when the user arrives, just wait in line and when it is your turn just use your smart cell phone, or tablet, or laptop and say cash ready and the money will come out in the ATM machine instantly the cash is available, most people will use their smart cell phone, or tablet, Taji your verbal assistant will help the user with their personal banking needs; this software will be available in foreign languages worldwide and wherever ATM machines are worldwide; as well all by verbal command.

The device of claim 1 wherein the functions are implemented using a verbal command assistant called Taji, with a male or female voice a user can select which voice they prefer, on my solar servers.

The device of the claim wherein the function has a solar engine for an automobile, with a computer in the dashboard screen; with a camera to view other drivers as well, to charge the engine just lift up the hood to let light in and it will recharge itself with a solar battery inside the car.

The device of claim 1 further comprising a display for visual output and speaker for audible output wherein said tablet display and said speaker are operable to function simultaneously, translate French, Spanish, any language on mobile devices for view on cell phone screen, tablet that user can see and hear in their native language for food service at restaurant or business, said wireless speaker with wireless receiver solar amplifier, for all musical instruments such as guitar.

The device of claim 1 further comprising: house lock down software on appliances, lights, doors, garage, entire property by verbal command, just say house lock down, when there is a power outage solar combined with the battery pack and solar farms will power users, just install battery packs in every city worldwide on the solar cell tower, can still use their cell phones, no need for a generator or waiting for a tower to get fixed, solar cell phone towers.

The device of claim 1 wherein the device is further operable to an attachable and detachable keyboard for the tablet, MP3 Player, for manual typing, that runs by software.

The device of claim 1 is further comprises a solar three-way solar radio for security work.

The device of claim 1 further comprising an agriculture application software for price on daily oat, wheat, corn, all agriculture commodities; and what they are trading for daily and forecast, and encrypted health care data stored as well, by verbal command.

The device of claim 1 wherein the device is further operable to track stats and blood line of thorough bred stallions that go back to Lord Godolphin, Barleyturk and Darley Arabian; the fathers of all race horses, their mares, such as champion horses, their track times, races won or lost, cost paid to buy the yearlings, date of birth, on cell phones, tablet, mobile devices.

The device of claim 1 wherein the device is operable to run data from solar servers, mobile wireless storage devices.

The device of claim 1 wherein the device is operable to store a terabyte trillion characters of data storage capacity on a tablet, cell phone, portable game player, laptop mobile devices, mp3 player, and stop false filings of stocks in New York and worldwide; so the stock market can't be interrupted by intentional hackers, the software will catch them that disrupt stock exchanges.

What is claimed is:

1. A portable tablet device comprising:
   a solar photo voltaic system comprising a solar cell and a battery,
   a first camera positioned on a front face of the tablet;
   a second camera positioned on a rear face of the tablet;
   a speaker positioned on the front face of the tablet;
   a display positioned on the front face of the tablet, wherein the display further comprises a light window port to allow transmission of light to the solar photo voltaic system, wherein the display is a ultra high definition display;
   a card reader for reading a smart card;
   a plurality of manual buttons including a menu button, next page button, and previous page button, wherein the next page button and previous page button are configured to change a displayed page;
   a microphone positioned on the front face of the tablet, wherein the microphone is configured to receive verbal commands to verbally control the tablet;
   a plurality of media ports consisting of a 3.5 millimeter audio output and a USB port;
   a detachable keyboard, wherein the tablet is executed by software stored on the keyboard;

an internal and external search engine to connect to external social networks, wherein photos are sorted by the first camera using verbal or manual commands; and the tablet comprises digital coding with encryption software; wherein the portable tablet includes feature and commands comprising:

a television feature which receive feeds for television stations;

a telephone feature to make and receive calls;

a personal assistant that out puts verbal information to a user in plural languages based on an input language, wherein the personal assistant outputs travel directions in response to a verbal command; wherein the tablet communicates wirelessly to a headset or an earplug;

a plurality of verbal commands comprising:

a video recording command to record a video;

a vr command to see and hear around the tablet;

a verbal kill switch command to stop fraudulent transactions;

a verbal scrolling command to scroll and zoom a page on the tablet;

a share and transfer command to share data wirelessly to other devices including mobile devices, cell phones, and desktop devices;

a transfer money command to transfer money; an order command to order food and allow a check to be received when finish with a meal, and paying for tips;

a house lock down command to lock appliances, lights, doors and house;

a Galaxy command to receive star gazing information and share star gazing information;

a travel command to enable travel directions to be output;

a payment feature comprising:

a waving of a cell phone or watch in close proximity to a tablet which enables a payment to be accepted.

* * * * *